Figure 1:
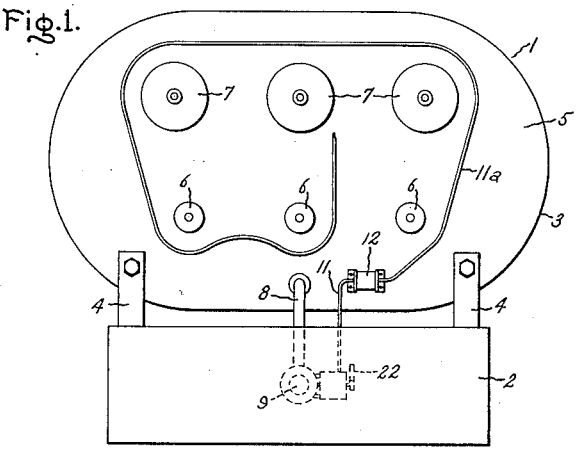

Feb. 26, 1952     M. UNGER     2,587,412
HYDRAULIC THERMOSTATIC MECHANISM FOR ELECTRIC
INDUCTION APPARATUS
Filed March 18, 1948     2 SHEETS—SHEET 1

Inventor:
Magnus Unger,
by Ernest H. C. Britton
His Attorney.

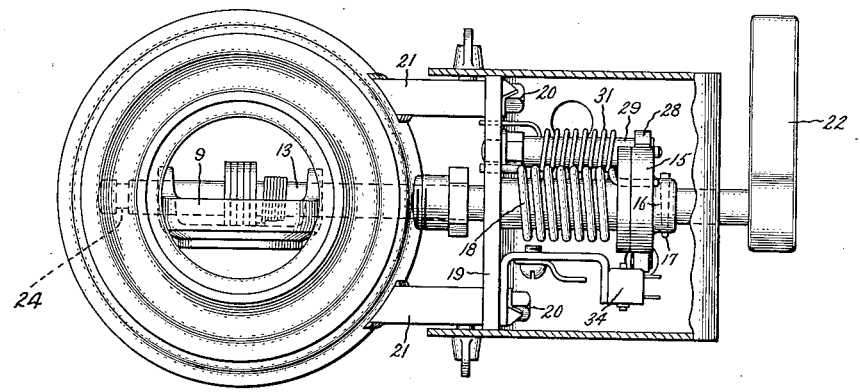

Patented Feb. 26, 1952

2,587,412

UNITED STATES PATENT OFFICE 2,587,412

HYDRAULIC THERMOSTATIC MECHANISM FOR ELECTRIC INDUCTION APPARATUS

Magnus Unger, Pittsfield, Mass., assignor to General Electric Company, a corporation of New York Application March 18, 1948, Serial No. 15,603

1 Claim. (Cl. 174—11)

This invention relates to thermostatic devices and more particularly to an hydraulic thermostatic mechanism for use as a fire protective device.

Various types of thermostatic elements have long been used in fire protection units. These elements usually fall into two main groups. The first group controls the operation of a mechanical device in the immediate vicinity of the thermostat. In this type there is direct transmission of the mechanical forces set up in the thermostat, due to temperature changes, from the thermostat to the device to be operated. The second group incorporates an extra operation to control remotely located devices. Thus, the thermostatic element may operate an electric switch which would then control the operation of a distantly located device. The first group of thermostatic units has the limitation of only operating immediately adjacent equipment; the second requires an external electrical power source.

This invention overcomes the limitations of both groups and controls the operation of a distantly located mechanical device without recourse to electrically operated relays and machines. It accomplishes this by the use of an hydraulic thermostatic system. This system includes a capillary tube which is completely filled with liquid, the abnormal heating of which (e. g. by fire) causes an increase of pressure which activates a bellows which is located at one end of the capillary tube. The motion of the bellows is used to control the operation of a mechanical device.

Since the pressure in the capillary tube and thus the pressure on the operating bellows is a function of temperature, changes in ambient temperature would effect the operation of this hydraulic thermostatic system if adjustment and compensations were not made for the variation of ambient temperature. Therefore, included in this system is a novel compensating device which permits the hydraulic thermostatic unit to operate satisfactorily over a very large range of ambient temperatures.

It is an object of this invention to provide a new and simple thermostatic device for the control of remotely located equipment.

It is another object of this invention to provide such a thermostatic device which requires no external source of power.

Still another object of this invention is to provide a new and simple hydraulic thermostatic device.

A further object of this invention is to provide a hydraulic thermostatic device whose operation is not effected by variations in ambient temperatures.

Another object of this invention is to provide an hydraulic thermostatic mechanism which may be used as a fire protective device.

The invention will be better understood from the following description taken in connection with the accompanying drawings and its scope will be pointed out in the appended claims.

Figure 2:
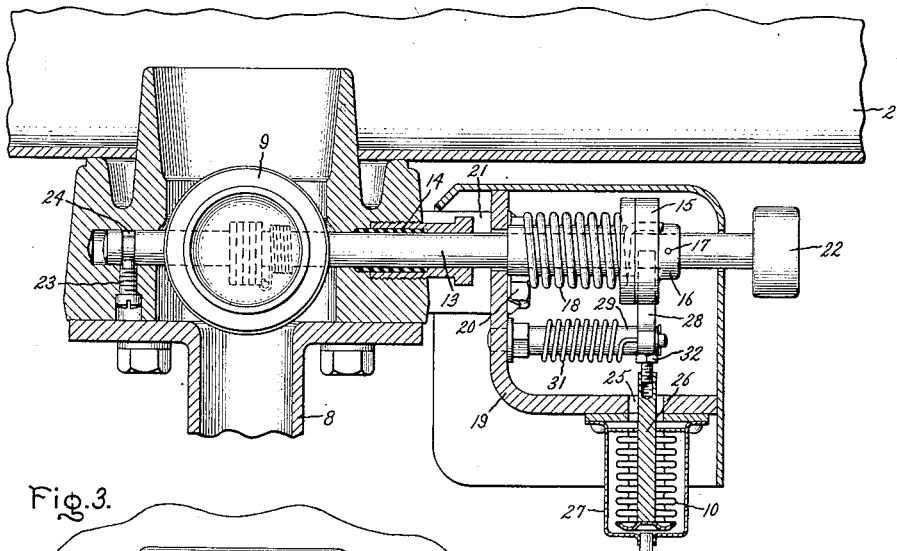
Figure 3:
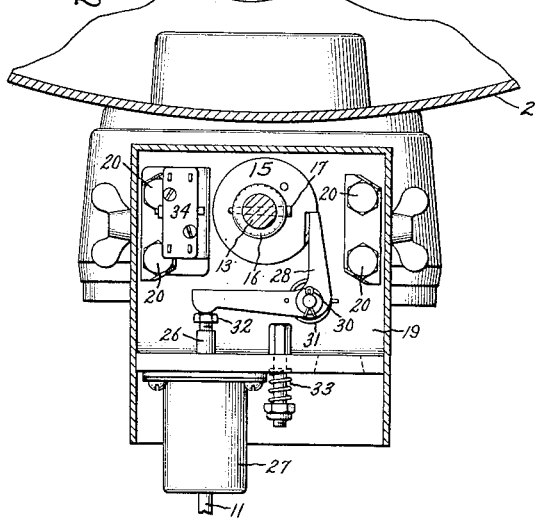

In the drawings, Fig. 1 is a plan view of a particular embodiment of the invention showing, by way of example, its application to use as a fire protective device for a high tension power transformer. Fig. 2 is a vertical sectional view of a preferred form of the operating bellows incorporated in this invention and of the associated mechanism which it controls in the particular application shown in Fig. 1. Fig. 3 is a side elevation, partly in section, and Fig. 4 is a plan view, partly broken away, of the unit shown in Fig. 2. Fig. 5 is a partially cross-sectional view of a preferred form of ambient temperature compensating device which is incorporated in this invention.

Referring now to the drawings there is shown in Fig. 1, by way of example, a high tension oil filled power transformer 1 which has an oil conservator or reservoir 2 which assures that the transformer tank 3 is completely filled with oil. The oil conservator 2 is held above the transformer tank 3 by the brackets 4. The tank 3 is closed by the cover 5 in which are mounted the insulating bushings 6 and 7 through which pass, respectively, the low and high tension leads. A power transformer of this type is usually mounted outdoors and is subjected to varying and extreme climatic conditions. Though infrequent, fires on the transformer tank cover 5 have occurred due to the fracturing of the bushings 6 or 7 by lightning and the subsequent ignition of the escaping transformer oil. Where normally the fire on the cover 5 would extinguish itself because of a decrease in the level of oil within the tank 3, the oil continues to overflow onto the cover 5 due to the action of the conservator 2. Thus, the fire continues burning causing serious damage. Therefore, what is desired is a means for automatically closing the pipe connection 8 between the conservator 2 and the transformer tank 3 in case of a fire on the tank cover 5.

This is accomplished by having in the pipe line 8 a normally open, spring operated, butterfly valve 9 which is closed when tripped by an hydraulically operated bellows 10. The bellows 10 is connected to a capillary tube 11 and an ambient temperature compensator 12 which divides the capillary tube mounted on the tank cover 5 into two sections, 11 and 11a.

Fig. 2 is an enlarged view of the spring operated butterfly valve 9 and the pipe connection 8 between the section of the conservator 2 shown and the transformer tank 3 which is not illustrated. A section of the capillary tube 11 which leads to the operating bellows 10 is also shown. Attached to the butterfly valve 9 is a shaft 13 which passes through a packing gland 14, the purpose of which is to prevent the escape of oil from around the shaft 13. Mounted on the shaft 13, external to the pipe 8, is a notched cam 15 and the collar 16 which is an integral part of the cam 15. Both the cam 15 and the collar 16 are fastened in position on the shaft 13 by the tapered pin 17. Surrounding the shaft 13 and having one end fastened within the cam 15 is a strong helical spring 18, the other end of which is fastened to the vertical side of the L-shaped plate 19 which is held by bolts 20 to the welded mounting arms 21, shown in Fig. 4. The shaft 13 has a handle 22 which is used for resetting the valve 9 in the open position. An aligning and retaining screw 23 rides in a groove 24 of shaft 13. Through a hole 25 in the horizontal side of the L-shaped plate 19 passes a rod 26 which also goes through the center of the bellows 10. The latter is located in the sealed container 27. The rod 26 operates a trigger 28 which engages the notched cam 15 and the trigger 28 rotates about shaft 29 being held on shaft 29 by cotter pin 30. If the trigger 28 is forced by the rod 26 from the locked position it will return to that position when the rod 26 is withdrawn due to the restorative action of a helical spring 31 which is wound about the shaft 29 and is fastened at one end to the trigger 28 and at the other end to the vertical side of the L-shaped plate 19.

Consider now the operation of the mechanism shown in Figs. 2, 3, and 4. Originally there is a certain specific liquid pressure in the hydraulically filled container 27. A set screw 32 in the end of the rod 26 is adjusted so that it is just touching the trigger 28. The trigger 28 engages the notched cam 15 and the valve 9 is held in the open position allowing for free flow of oil between the conservator 2 and the transformer tank 3. Due to some external occurrence (e. g. a fire on the cover 5 of the transformer tank 3) the hydraulic pressure within the container 27 is increased appreciably. The bellows 10 is compressed forcing the rod 26 and thus the screw 32 against the trigger 28. When the motion of the rod 26 is great enough the trigger 28 disengages the notched cam 15. As this happens the shaft 13 rotates approximately 90° due to the action of the helical spring 18, and the butterfly valve 9 is closed stopping the flow of oil between the conservator 2 and the transformer tank 3. When it is desired to restore the oil flow all that need be done is to turn the handle 22 to the open position and the trigger 28 reengages the notched cam 15 due to the action of the helical spring 31. Thus an increase in hydraulic pressure on bellows 10 causes a series of sequential operations which results in the closing of the valve 9.

Shown in Fig. 3 is a push button arrangement 33 for disengaging the trigger 28 from the notched cam 15 so that the butterfly valve 9 may be closed at any time. There is also shown a small snap action over-center switch 34 which may be a double pole single throw switch and is operated by the cam 15. The switch 34, in its normal position with the valve 9 open, may operate an indicating light. When the valve 9 closes the cam 15 opens one contact of the switch 34 and closes the other. The opening of the contact breaks the circuit to the light which indicates the valve 9 is open, and the closing of the second contact of switch 34 may be used to activate an alarm and open the circuit breaker to the transformer 1.

As stated previously the bellows 10 is sensitive to variations in the liquid pressure within the container 27 as communicated to the container 27 through the capillary tube 11. The capillary tube must be of fairly great length as shown by 11a in Fig. 1 so as to afford fire protection from all the insulating bushings 6 and 7. In the illustrated application of this thermostatic device the ambient temperature may vary from approximately −30° C. to +90° C. on the cover 5 of the transformer tank 3 depending upon the load conditions of transformer 1 and the climatic temperature. For a 120° C. range of temperature considerable expansion and contraction of fluid within the capillary tube 11a will occur. This change of volume of thermostatic fluid would result in a variation of pressure within the container 27 and, therefore, the increment in pressure necessary to cause the valve 9 to close will be altered. This condition is undesirable; what is needed is an ambient temperature compensating device which changes the total volume occupied by the thermostatic fluid when the ambient temperature varies so that the hydraulic pressure within the container 27 remains constant except in the case of intense local heating of the capillary tube 11a.

In Fig. 5 there is shown a preferred form of ambient temperature compensator 12 which is constructed of a cylindrical metallic shell 35 closed at both ends by L-shaped plates 36. Within the cylinder 35 is placed an expansible liquid-filled tube in the form of a compensating coil 37 one end of which leads to a bellows 38 and a container 39 and the other end of which is closed. The bellows 38 is interconnected by means of the shaft 40 and the interconnecting bracket 41 with the shaft 42 which is fastened to the bellows 43. The bellows 43 is housed within the container 44 which is open to the capillary tube 11 and 11a at juncture 45. Both containers 39 and 44 are fastened to the cylinder 46 by the circular brackets 47 and 48. The cylinder 46 is fastened to the L-shaped plate 36 by screws 49.

The ambient temperature compensator 12 operates in the following manner. The compensating coil 37 and its attached container 39 is filled with the same liquid as the capillary tube 11 and its attached containers 44 and 27. The total volume of the compensating coil 37 and its associated container 39 with the bellows 38 in place is equal to the total volume of the capillary tube 11 and 11a, the container 44 with bellows 43 in place, and container 27 with bellows 10 in place. When there is an increase in the ambient temperature the fluid in the compensating coil 37 and its attached container 39 expands causing the bellows 38 to be compressed. The movement of the bellows 38 is transmitted through the previously described interconnecting means and the bellows 43 is caused to compress also. When the bellows 43 compresses the available volume of container 44 is increased. Due to the rise in ambient temperature the fluid in the capillary tubes 11 and 11a and associated parts has expandeed but since the volume of the system has increased due to the compression of the bellows 43 there is a negligible change in the fluid pressure within the capillary tube 11 and particularly within the container 27. Thus the container 44 acts as a variable volume reservoir; its volume increases with an increase in ambient temperature and decreases as the ambient temperature drops. This permits a constant pressure to be maintained within the container 27.

When local heating of the capillary tube 11 occurs, such as would be due to an oil fire on the tank cover 5 near a broken bushing 6 or 7, the ambient temperature compensator 12 does not operate; the pressure within the container 27 increases and the valve 9 is closed as previously explained.

While there has been shown and described a particular embodiment of this invention it will be obvious to those skilled in the art that various changes and modifications can be made therein without departing from the invention and, therefore, it is aimed in the appended claim to cover all such changes and modifications as fall within the true spirit and scope of the invention.

What I claim as new and desire to secure by Letters Patent of the United States is:

In combination, an oil filled electric induction apparatus having a conservator and frangible insulating bushings, means including a normally open valve interconnecting said conservator and said apparatus, a spring for biasing said valve to its closed position, a trigger latch for holding said valve in its open position against the action of said spring, means including a bellows for tripping said latch, a capillary tube connected to said bellows and extending in the vicinity of a plurality of said bushings, an expansible fluid filling said tube and bellows, a second bellows hydraulically connected to said tube, a third bellows mechanically connected to and outside of said second bellows, and a second expansible liquid filled tube in the form of a compensating coil having one end closed and the other end hydraulically connected to said third bellows, said second tube being wound around said third bellows.

MAGNUS UNGER.

REFERENCES CITED

The following references are of record in the file of this patent:

UNITED STATES PATENTS

| Number | Name | Date |
|---|---|---|
| 1,189,806 | Gibson | July 4, 1916 |
| 1,299,850 | MacDonald | Apr. 9, 1919 |
| 1,830,860 | Charles | Nov. 10, 1931 |
| 1,869,176 | Polley | July 26, 1932 |
| 1,869,204 | Lowe et al. | July 26, 1932 |
| 2,053,944 | Cooney | Sept. 8, 1936 |
| 2,154,030 | Brumbough | Apr. 11, 1939 |
| 2,275,949 | Evans | Mar. 10, 1942 |
| 2,395,007 | Leupold | Feb. 19, 1946 |
| 2,493,351 | Jones | Jan. 3, 1950 |